US007702450B2

(12) United States Patent
Pfohl et al.

(10) Patent No.: US 7,702,450 B2
(45) Date of Patent: Apr. 20, 2010

(54) AUTOMATIC IDLE ADJUSTMENT AND SHUTDOWN OF VEHICLE

(75) Inventors: Kevin Lee Pfohl, Potosi, WI (US); Teryl M. Oftedal, East Dubuque, IL (US); Kevin W. Campbell, Dubuque, IA (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 12/059,750

(22) Filed: Mar. 31, 2008

(65) Prior Publication Data

US 2009/0234563 A1 Sep. 17, 2009

Related U.S. Application Data

(60) Provisional application No. 61/035,633, filed on Mar. 11, 2008.

(51) Int. Cl.
*B60K 15/00* (2006.01)
*G06F 19/00* (2006.01)

(52) U.S. Cl. ................................ 701/112; 123/198 DB

(58) Field of Classification Search ................ 701/112, 701/113, 102, 29, 30, 35; 123/198 DB
See application file for complete search history.

(56) References Cited

U.S. PATENT DOCUMENTS 4,457,392 A 7/1984 Cadwell et al.
4,534,466 A 8/1985 Wood
4,562,808 A 1/1986 Tominaga et al.
4,590,906 A 5/1986 Uriuhara et al.
4,597,047 A 6/1986 Deutsch
4,660,519 A 4/1987 Stocker et al.
4,697,562 A 10/1987 Boccadoro et al.
4,841,447 A 6/1989 Hayashi et al.
4,977,878 A 12/1990 Hubbard, Jr.
5,005,546 A 4/1991 Mann
5,014,666 A 5/1991 Westenberger
5,040,507 A 8/1991 Hayes et al.
5,480,364 A 1/1996 Hilbert et al.
5,528,500 A 6/1996 Al-Charif et al.
5,611,751 A 3/1997 Ehrenhardt et al.
6,019,702 A 2/2000 Ehrenhardt et al.
6,021,755 A 2/2000 Maddock et al.
6,060,981 A * 5/2000 Landes .................. 340/426.12
6,092,504 A 7/2000 Barnes et al.
6,173,696 B1 1/2001 Fett et al.
6,182,634 B1 2/2001 Caldwell et al.
6,338,697 B1 1/2002 Baudion et al.
6,363,906 B1 * 4/2002 Thompson et al. .... 123/198 DB
6,366,848 B1 * 4/2002 Gustavsson ................. 701/123
6,421,589 B1 7/2002 Bederna et al.

(Continued)

OTHER PUBLICATIONS

"Muirhead Protection Systems -Excess Idle Shutdown ", Dec. 4, 2005, 1 pg., Remote Control Technologies, also available at www.rct.net.au.

(Continued)

*Primary Examiner*—Hieu T Vo
(74) *Attorney, Agent, or Firm*—Baker & Daniels LLP

(57) ABSTRACT

A vehicle is disclosed having an automatic idle adjustment system. The vehicle may also include an automatic shutdown system. A method for utilizing the automatic idle adjustment system and the shutdown system is also disclosed.

23 Claims, 6 Drawing Sheets

U.S. PATENT DOCUMENTS

| | | | | |
|---|---|---|---|---|
| 6,530,426 | B1 | 3/2003 | Kishita et al. | |
| 6,817,338 | B2 | 11/2004 | Janic et al. | |
| 6,845,751 | B2 | 1/2005 | Lee | |
| 7,040,269 | B2 | 5/2006 | Dehrmann | |
| 7,104,924 | B2 | 9/2006 | Hawkins | |
| 7,310,576 | B1 * | 12/2007 | Letang et al. | 701/112 |
| 7,377,103 | B2 | 5/2008 | Yu et al. | |

OTHER PUBLICATIONS

"Caterpillar Celebrates Track-Type Tractor $100^{th}$ Anniversary", Dec. 2004, 12 pg.

* cited by examiner

AUTOMATIC IDLE ADJUSTMENT AND SHUTDOWN OF VEHICLE

BACKGROUND

1. Field of the Invention

The present disclosure relates to a vehicle having a control system. More particularly, the present disclosure relates to a vehicle having an automatic idle adjustment system, and to a method for utilizing the same.

2. Description of the Related Art

A work vehicle, such as a loader, a bulldozer, an excavator, or a motor grader, may be operated to push, shear, carry, and/or spread soil and other material. When the work vehicle is not in use, the engine may be left running in an idle state. Even in this idle state, the vehicle consumes fuel and the engine is subjected to wear.

SUMMARY

According to an embodiment of the present disclosure, a work vehicle is provided having a chassis, a ground engaging mechanism, an engine, a work tool, and a control system. The ground engaging mechanism is configured to support and propel the chassis. The engine is coupled to the ground engaging mechanism to power the ground engaging mechanism. The work tool is supported by the chassis to move material. The control system has an idle function configured to operate the engine in a first idle state for a first period of time, and to operate the engine in a second idle state after the first period of time expires. The engine operates at a lower speed in the second idle state than in the first idle state.

According to another embodiment of the present disclosure, a work vehicle is provided having a chassis, a ground engaging mechanism, an engine, a work tool, an idle timer, and a shutdown timer. The ground engaging mechanism is configured to support and propel the chassis. The engine is coupled to the ground engaging mechanism to power the ground engaging mechanism. The work tool is supported by the chassis to move material. The engine operates in a first idle state, and the idle timer controls the duration of the first idle state. When the idle timer expires, the engine operates in a second idle state at a lower speed than in the first idle state. The shutdown timer controls the duration of the second idle state, and the engine shuts down when the shutdown timer expires.

According to yet another embodiment of the present disclosure, a method is provided for automatically adjusting a speed of an engine of a work vehicle. The method includes the steps of providing a work vehicle having the engine and an idle timer, automatically starting the idle timer when the engine begins to operate in a first idle state, and automatically reducing the speed of the engine to operate in a second idle state when the idle timer expires.

BRIEF DESCRIPTION OF THE DRAWINGS

The above-mentioned and other features of the present disclosure will become more apparent and the present disclosure itself will be better understood by reference to the following description of embodiments of the present disclosure taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
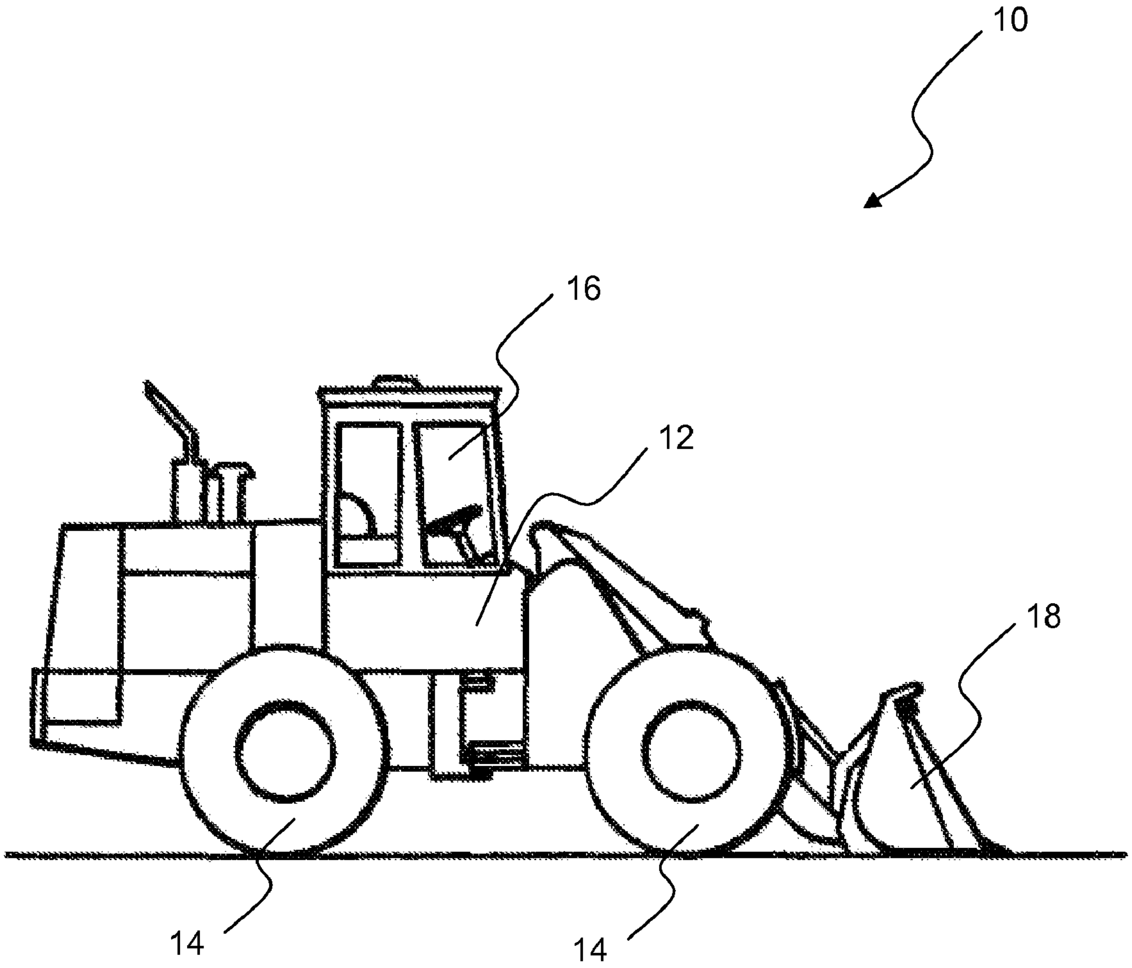
FIG. 1 is a side view of a work vehicle of the present disclosure.

Referring to FIG. 1, a work vehicle in the form of loader 10 is provided. Although the work vehicle is illustrated and described herein as loader 10, the work vehicle may include any other type of work vehicle including a construction vehicle, such as a bulldozer, an excavator, or a motor grader, or an agricultural vehicle, such as a tractor, combine, or a harvester. Loader 10 includes articulated chassis 12 and ground engaging mechanism 14. Ground engaging mechanism 14 may include any device capable of supporting and/or propelling chassis 12. For example, as illustrated in FIG. 1, ground engaging mechanism 14 includes wheels. Ground engaging mechanism 14 may also include belts or steel tracks. Loader 10 also includes operator cab 16 supported by chassis 12 for an operator of loader 10. Operator cab 16 includes a monitor (not shown) configured to communicate various messages to the user and receive inputs from the user.

Figure 2:
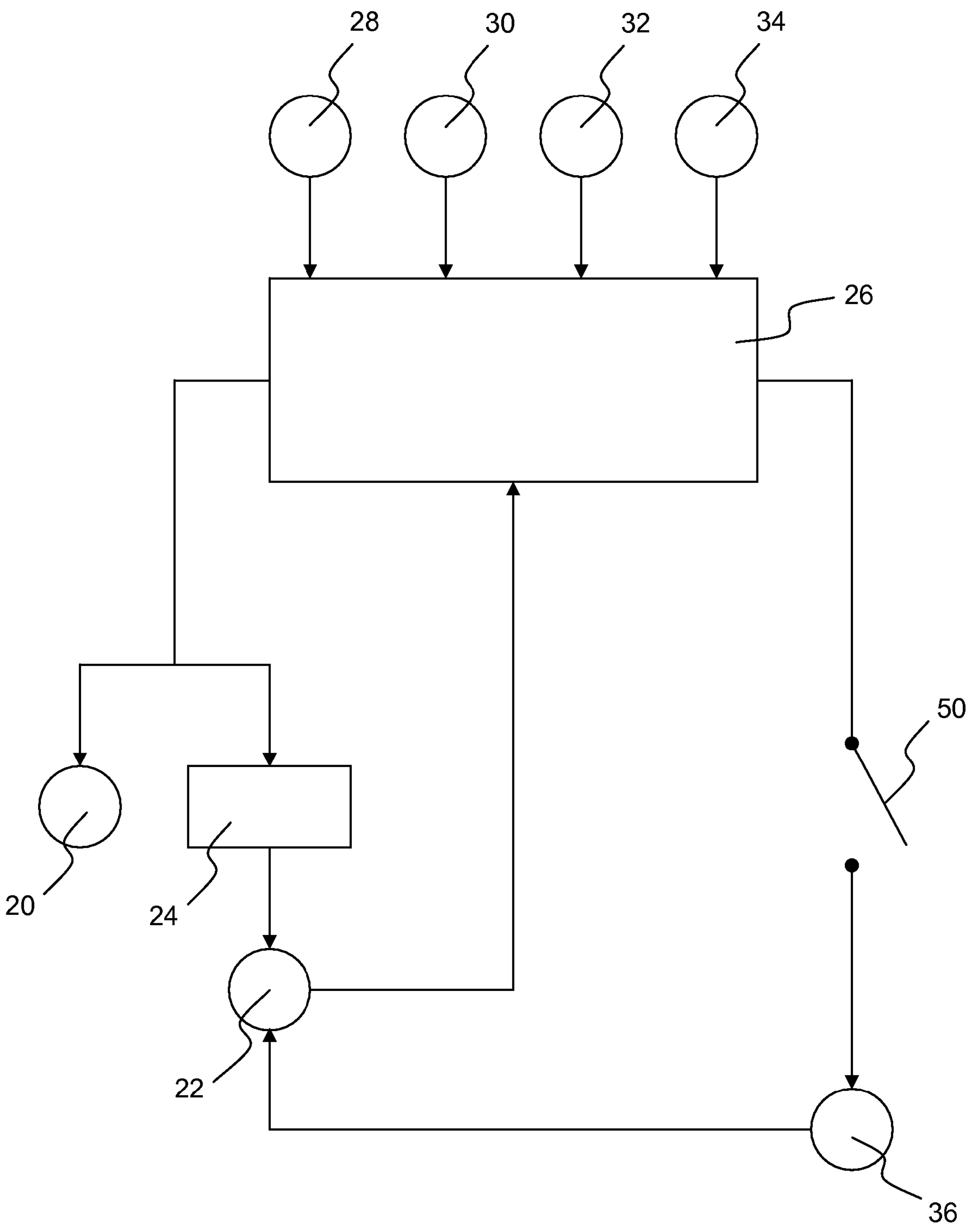
FIG. 2 is a schematic representation of a vehicle having a control system of the present disclosure.

Referring to FIGS. 1 and 2, loader 10 further includes work tool 18 supported by chassis 12. Work tool 18 may be forwardly mounted to chassis 12 and may include any device configured to move materials. For example, work tool 18 may include a bucket, as shown in FIG. 1, that scoops and dumps materials, such as dirt, sand, gravel, snow, salt, and other materials. Other work tools 18, such as blades, pallet forks, bail lifts, augers, harvesters, tillers, mowers, and other work tools may also be provided to move materials. Loader 10 may also include hydraulic components 20 configured to operate work tool 18.

Referring still to FIGS. 1 and 2, loader 10 further includes engine 22. Engine 22 is coupled to ground engaging mechanism 14 to power ground engaging mechanism 14. Specifically, engine 22 may be coupled to a transmission (not shown), and the transmission may in turn be coupled to ground engaging mechanism 14 to power ground engaging mechanism 14. Loader 10 also includes engine control unit 24 configured to control the operation of engine 22.

Referring still to FIGS. 1 and 2, loader 10 further includes system control unit 26. System control unit 26 may be configured to communicate with various peripherals, such as throttle 28, parking brake 30, battery 32, oil pump 34, and/or ignition 36. For example, system control unit 26 may receive signals from a throttle position sensor (not shown) indicating the position of throttle 28, which controls the supply of fuel to engine 22. System control unit 26 may also be configured to communicate with engine control unit 24 or with engine 22 directly. For example, system control unit 26 may be configured to monitor the speed of loader 10 across the ground.

Figure 3:
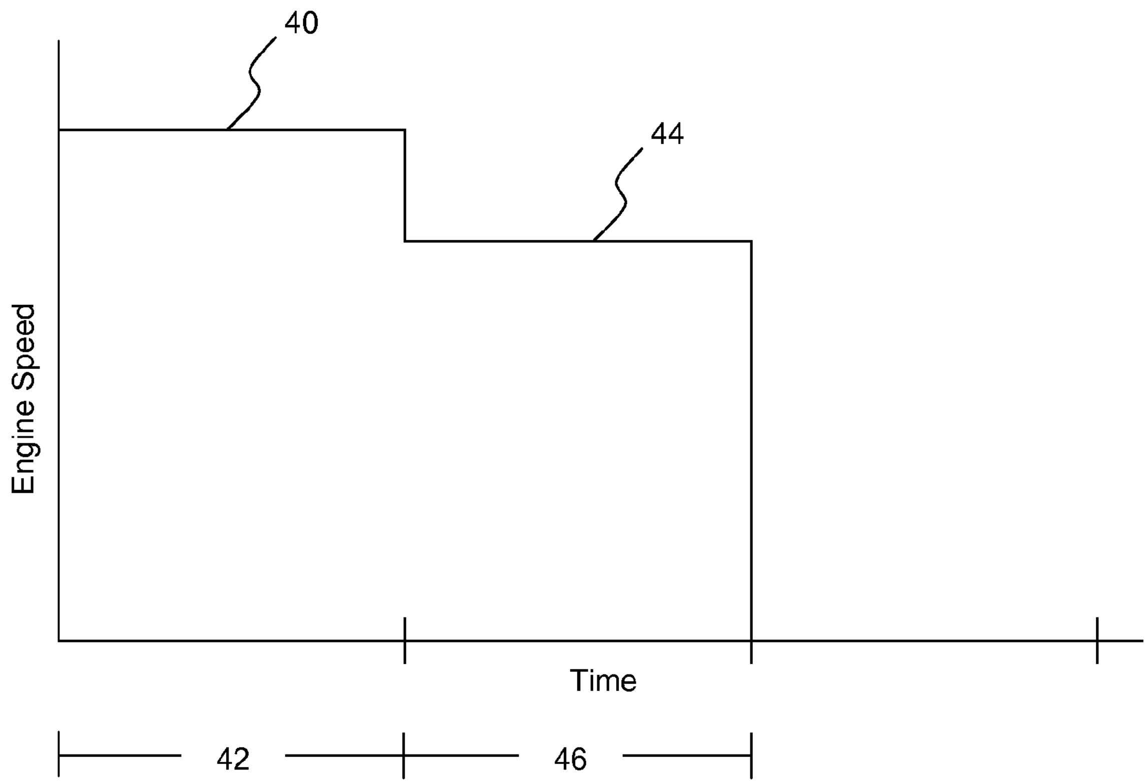
FIG. 3 is a graph of engine speed versus time showing the engine speed under control of an automatic idle adjustment and shutdown system of the present disclosure.

As shown in FIG. 3, the present disclosure provides an idle function, which reduces the wear on engine 22 and the amount of fuel consumed by loader 10. The idle function is configured to operate engine 22 in first idle state 40 for first period of time 42 and to operate engine 22 in second idle state 44 for second period of time 46. Second period of time 46 occurs after first period of time 42 expires. In both first idle state 40 and second idle state 44, engine 22 is running, but ground engaging mechanism 14 is not driven. Engine 22 operates at a lower speed in second idle state 44 than in first idle state 40. For example, the speed of engine 22 may drop by approximately 20% to 40% from first idle state 40 to second idle state 44, and more specifically, the speed of engine 22 may drop from between approximately 900 and 950 rpm in first idle state 40 to between approximately 600 and 700 rpm in second idle state 44. In addition to reducing the speed of engine 22 in second idle state 44, hydraulic components 20 may be disabled and engine 22 may shift to operate along a different torque curve.

Referring still to FIG. 3, the idle function is configured to be modified by a user. From the monitor in operator cab 16 (FIG. 1), the user may disable the idle function altogether. Also from the monitor, the user may set an idle timer to control the duration of first period of time 42. The duration of first period of time 42 may be chosen from various provided increments, such as 5, 15, and 30 minute increments. The duration of the idle timer may be set to abide by site-specific and/or state-specific idling requirements.

Referring to FIGS. 2 and 3, to determine whether engine 22 is operating in first idle state 40 or second idle state 44, system control unit 26 may monitor the behavior of engine 22 itself and/or various peripherals. More specifically, system control unit 26 may monitor the behavior of engine 22 directly or via engine control unit 24, throttle 28, parking brake 30, battery 32, and/or oil pump 34. For example, system control unit 26 may determine that engine 22 is operating in first idle state 40 or second idle state 44 if one or more of the following conditions is satisfied: (1) engine 22 is operating at less than approximately 950 rpm; (2) engine 22 is operating at a load less than approximately 25%; (3) the position of throttle 28 is less than approximately 2.0%; (4) parking brake 30 is engaged; (5) ground speed is less than approximately 0.5 kph; (6) the voltage of battery 32 exceeds approximately 24V; and (7) the pressure at oil pump 34 is sufficient. System control unit 26 need not monitor the same peripherals to determine whether engine 22 is operating in first idle state 40 as it does to determine whether engine 22 is operating in second idle state 44. For example, system control unit 26 may stop monitoring the load upon engine 22 when engine 22 begins to operate in second idle state 44.

Figure 4:
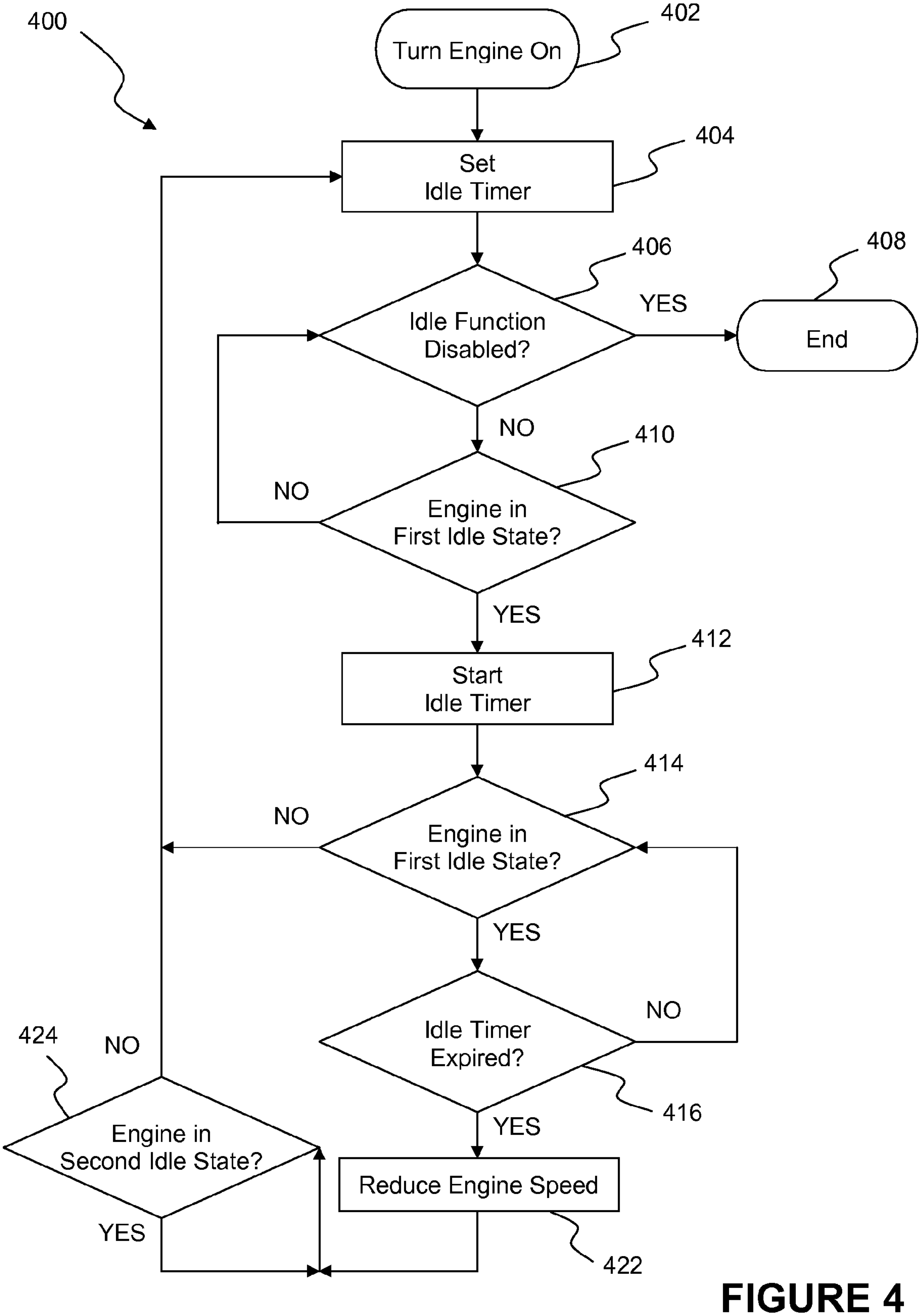
FIG. 4 is a flow diagram depicting an automatic idle adjustment system of the present disclosure.

An embodiment of the idle function is illustrated schematically as method 400 in FIG. 4. Beginning at block 402, engine 22 is turned on. At block 404, the idle timer is set to control the duration of first period of time 42. For example, the idle timer may be set for 5, 15, or 30 minutes. At block 406, system control unit 26 ensures that the idle function has not been disabled by the user. If the idle function has been disabled, method 400 ends at block 408. If the idle function has not been disabled, method 400 continues to block 410. At block 410, system control unit 26 determines whether engine 22 is operating in first idle state 40 or in an active state. During normal operation of loader 10, engine 22 will typically operate in the active state, not first idle state 40, because engine 22 will be powering ground engaging mechanism 14 and/or hydraulic components 20. Once system control unit 26 determines that engine 22 is operating in first idle state 40, the idle timer is initiated at block 412 to start measuring first period of time 42. Between blocks 414 and 416, system control unit 26 ensures that engine 22 is operating in first idle state 40 until the idle timer expires at the end of first period of time 42. If engine 22 begins to operate in the active state and ceases to operate in first idle state 40 before the idle timer expires, the idle timer is reset at block 404. When the idle timer expires, the speed of engine 22 is reduced at block 422 to operate in second idle state 44. At block 424, system control unit 26 determines whether engine 22 is operating in second idle state 44. If engine 22 begins to operate in the active state and ceases to operate in second idle state 44, the idle timer is reset at block 404.

As shown in FIGS. 2 and 3, the present disclosure further provides a shutdown function, which reduces the wear on engine 22 and the amount of fuel consumed by loader 10. The shutdown function is configured to shutdown engine 22 after second period of time 46, in which engine 22 operates in second idle state 44, expires. Engine 22 may be shutdown by turning off power to ignition 36 of loader 10, which has the same effect as shutting down loader 10 with a key. For example, engine 22 may be shutdown by opening relay switch 50 between system control unit 26 and ignition 36.

Like the idle function, the shutdown function is configured to be modified by a user. From the monitor in operator cab 16 (FIG. 1), the user may disable the shutdown function altogether. The user may choose to disable the idle function along with the shutdown function, or the user may choose to disable the shutdown function without disabling the idle function. Also from the monitor, the user may set a shutdown timer to control the duration of second period of time 46. The duration of second period of time 46 may be chosen from various provided increments, such as 5, 15, and 30 minute increments. The duration of the shutdown timer may be set to abide by site-specific and/or state-specific idling requirements.

Figure 5:
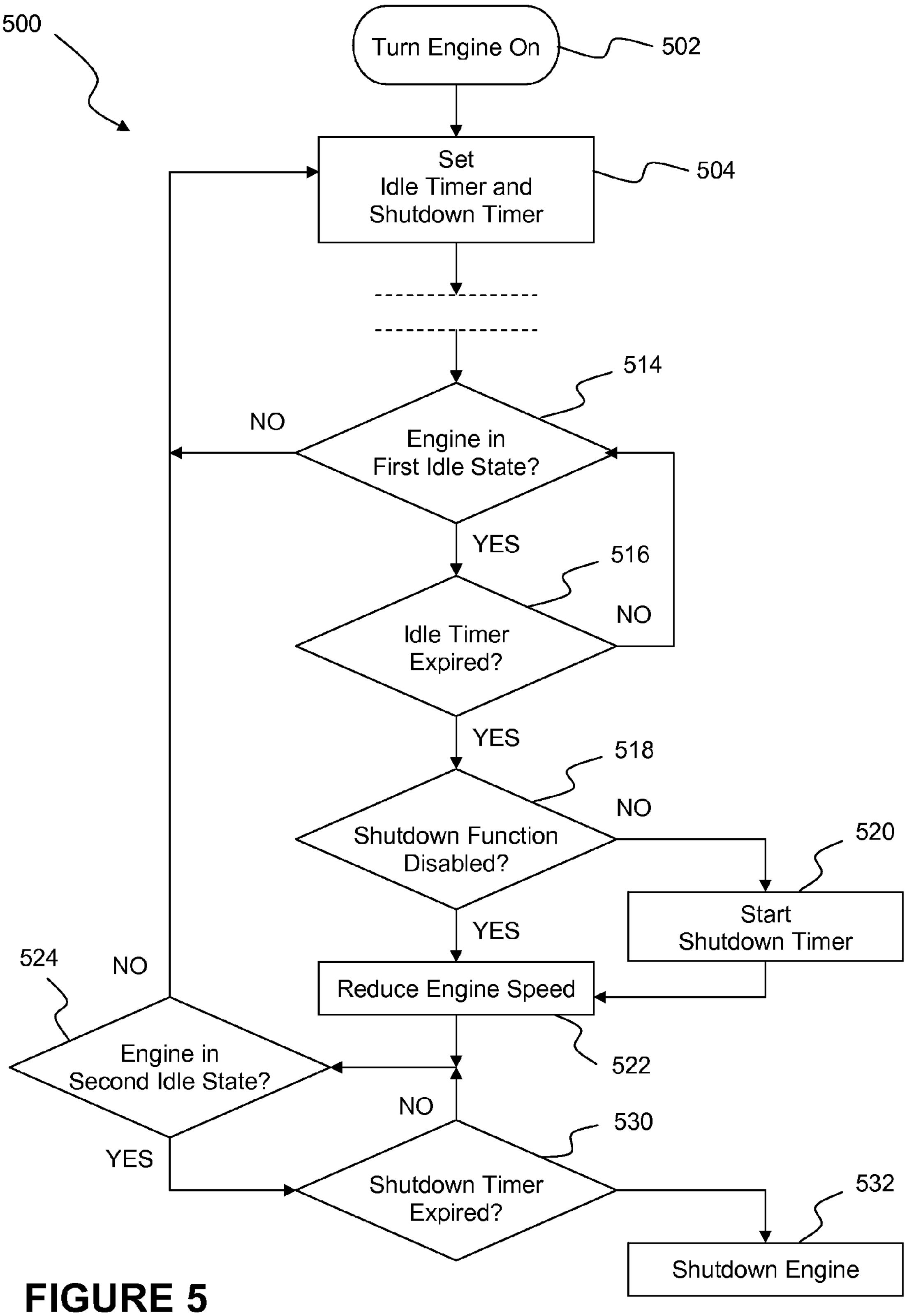
FIG. 5 is a flow diagram similar to FIG. 3 depicting an automatic idle adjustment system and an automatic shutdown system of the present disclosure.

An embodiment of the shutdown function is illustrated schematically as method 500 in FIG. 5. Overlapping steps in method 400 (FIG. 4) and method 500 are labeled with the same last two digits. Beginning with block 502, engine 22 is turned on. At block 504, the idle timer is set to control the duration of first period of time 42, and the shutdown timer is set to control the duration of second period of time 46. For example, the idle timer and the shutdown timer may each be set for 5, 15, or 30 minutes. Blocks corresponding to blocks 406-412 of method 400 have been omitted from FIG. 5 because they are similar to blocks 406-412 of method 400. Between blocks 514 and 516, system control unit 26 ensures that engine 22 is operating in first idle state 40 until the idle timer expires at the end of first period of time 42. If engine 22 begins to operate in the active state and ceases to operate in first idle state 40 before the idle timer expires, the idle timer is reset at block 504. When the idle timer expires, system control unit 26 ensures at block 518 that shutdown function 38 has not been disabled by the user. If the idle function has not been disabled, the shutdown timer is initiated at block 520 to start measuring second period of time 46, and then the speed of engine 22 is reduced at block 522 to operate in second idle state 44. If the idle function has been disabled, the shutdown timer is not initiated at block 520 before reducing the speed of engine 22 at block 522. Between blocks 524 and 530, system control unit 26 ensures that engine 22 is operating in second idle state 44 until the shutdown timer expires at the end of second period of time 46. If engine 22 begins to operate in the active state and ceases to operate in second idle state 44 before the shutdown timer expires, the idle timer and the shutdown timer are reset at block 504. If the shutdown timer expires, engine 22 is shutdown at block 532.

Figure 6:
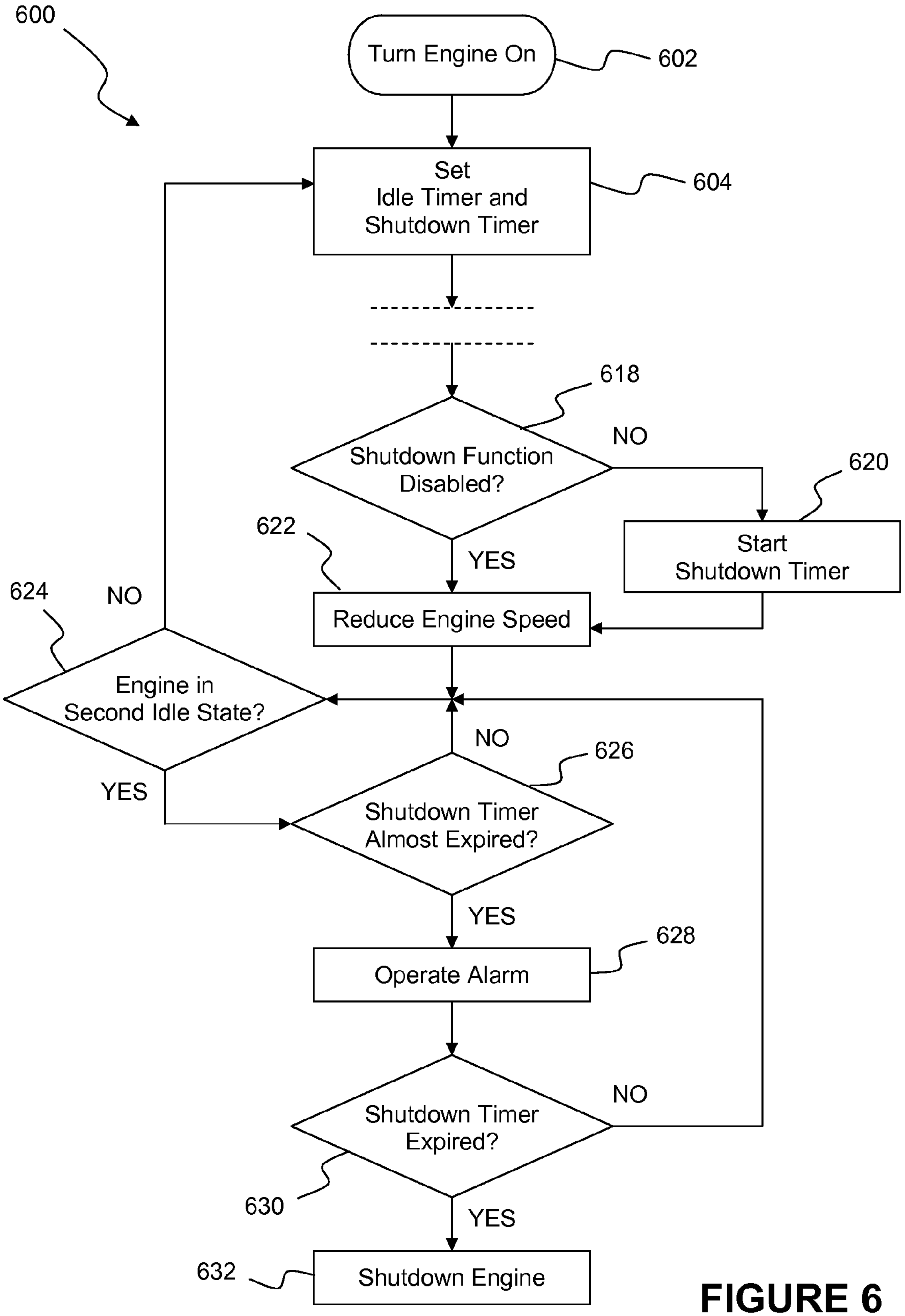
FIG. 6 is a flow diagram similar to FIG. 4 depicting an alternative automatic shutdown adjustment system of the present disclosure.

Another embodiment of the shutdown function is illustrated schematically as method 600 in FIG. 6. Overlapping steps in method 400 (FIG. 4), method 500 (FIG. 5), and method 600 are labeled with the same last two digits. Like method 500, between blocks 624 and 630, system control unit 26 ensures that engine 22 is operating in second idle state 44 until the shutdown timer expires at the end of second period of time 46. Unlike method 500, method 600 includes blocks 626 and 628 between blocks 624 and 630. When the shutdown timer is nearing expiration, an alarm is operated at block 628.

For example, when the shutdown timer is within 30 seconds of expiration, an audible alarm may sound and a message may appear on the monitor in operator cab 16 (FIG. 1). The audible alarm may include a series of clicks that becomes more frequent as the shutdown timer approaches expiration. Similarly, the audible alarm may increase in pitch or volume as the shutdown timer approaches expiration. Like method 500, if engine 22 begins to operate in an active state and ceases to operate in second idle state 44 before the shutdown timer expires, the idle timer and the shutdown timer are reset at block 604. If the shutdown timer expires, engine 22 is shutdown at block 632.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle including:
- a chassis;
- a ground engaging mechanism configured to support and propel the chassis;
- an engine coupled to the ground engaging mechanism to power the ground engaging mechanism;
- a work tool supported by the chassis to move material; and
- a control system having an idle function configured to operate the engine in a first idle state for a first period of time, and to operate the engine in a second idle state after the first period of time expires, the engine operating at a lower speed in the second idle state than in the first idle state.

2. The work vehicle of claim 1, wherein the idle function of the control system is configured to be disabled by a user.

3. The work vehicle of claim 1, wherein the first period of time is adjustable.

4. The work vehicle of claim 1, wherein the engine operates between approximately 900 and 950 rpm in the first idle state and between approximately 600 and 700 rpm in the second idle state.

5. The work vehicle of claim 1, wherein the speed of the engine drops by approximately 20% to 40% from the first idle state to the second idle state.

6. The work vehicle of claim 1, further including at least one of a throttle, a parking brake, a battery, and an oil pump, the control system being configured to monitor at least one of the throttle, the parking brake, the battery, the oil pump, a vehicle ground speed, and the engine to determine when the engine is operating in the first idle state.

7. The work vehicle of claim 1, wherein the control system is configured to reset the first period of time when the engine operates in an active state.

8. The work vehicle of claim 1, wherein the control system has a shutdown function configured to shutdown the engine after a second period of time after the second idle state begins.

9. A work vehicle including:
- a chassis;
- a ground engaging mechanism configured to support and propel the chassis;
- an engine coupled to the ground engaging mechanism to power the ground engaging mechanism;
- a work tool supported by the chassis to move material;
- an idle timer; and
- a shutdown timer, the engine operating in a first idle state, the idle timer controlling the duration of the first idle state, the engine operating in a second idle state when the idle timer expires, the engine operating at a lower speed in the second idle state than in the first idle state, the shutdown timer controlling the duration of the second idle state, and the engine shutting down when the shutdown timer expires.

10. The work vehicle of claim 9, wherein the idle timer is configured to be disabled by a user.

11. The work vehicle of claim 9, wherein a duration of the idle timer and a duration of the shutdown timer are adjustable.

12. The work vehicle of claim 9, wherein the engine operates between approximately 900 and 950 rpm in the first idle state and between approximately 600 and 700 rpm in the second idle state.

13. The work vehicle of claim 9, wherein the speed of the engine drops by approximately 20% to 40% from the first idle state to the second idle state.

14. The work vehicle of claim 9, further including at least one of a throttle, a parking brake, a battery, and an oil pump, the control system being configured to monitor at least one of the throttle, the parking brake, the battery, the oil pump, a vehicle ground speed, and the engine to determine when the engine is operating in the first idle state.

15. The work vehicle of claim 9, wherein the control system is configured to reset the idle timer and the shutdown timer when the engine operates in an active state.

16. The work vehicle of claim 9, further including an alarm system configured to communicate the impending expiration of the shutdown timer to a user.

17. A method of automatically adjusting a speed of an engine of a work vehicle, including the steps of:
- providing a work vehicle having the engine and an idle timer;
- automatically starting the idle timer when the engine begins to operate in a first idle state; and
- automatically reducing the speed of the engine to operate in a second idle state when the idle timer expires.

18. The method of claim 17, further including the steps of:
- further providing the vehicle with a shutdown timer;
- automatically starting the shutdown timer when the engine begins to operate in the second idle state; and
- automatically turning the engine off when the shutdown timer expires.

19. The method of claim 18, further including the step of automatically initiating an alarm to communicate the impending shutdown of the engine to a user.

20. The method of claim 17, further including the steps of:
- further providing the vehicle with at least one of a throttle, a parking brake, a battery, and an oil pump; and
- monitoring at least one of the throttle, the parking brake, the battery, the oil pump, a vehicle ground speed, and the engine to determine when the engine is operating in the first idle state.

21. The method of claim 17, further including the step of selecting a duration of the idle adjustment timer.

22. The method of claim 17, further including the step of resetting the idle adjustment timer when the engine begins to operate in an active state.

23. The method of claim 17, wherein the step of automatically turning the engine off involves automatically turning off power to an ignition of the vehicle.

* * * * *